United States Patent [19]
Dalebout et al.

[11] Patent Number: 5,192,255
[45] Date of Patent: Mar. 9, 1993

[54] ADJUSTABLE INCLINE SYSTEM FOR EXERCISE EQUIPMENT

[75] Inventors: William T. Dalebout; S. Ty Measom; Scott R. Watterson, all of Logan, Utah

[73] Assignee: Weslo, Inc., Logan, Utah

[21] Appl. No.: 806,977

[22] Filed: Dec. 12, 1991

Related U.S. Application Data

[63] Continuation of Ser. No. 494,590, Mar. 16, 1990, abandoned, which is a continuation of Ser. No. 256,486, Oct. 12, 1988, Pat. No. 4,913,396.

[51] Int. Cl.$^5$ .............................................. A63B 23/06
[52] U.S. Cl. .................................... 482/54; 248/371
[58] Field of Search ............... 248/371, 649, 398, 654; 272/69

[56] References Cited

U.S. PATENT DOCUMENTS

| | | |
|---|---|---|
| 4,591,147 | 5/1986 | Smith et al. ............................ 272/69 |
| 4,643,418 | 2/1987 | Bart ........................................ 272/69 |
| 4,729,558 | 3/1988 | Kuo ........................................ 272/69 |
| 4,792,134 | 12/1988 | Chen ...................................... 272/69 |
| 4,813,743 | 3/1989 | Mizelle .................................. 297/357 |

*Primary Examiner*—Blair M. Johnson
*Attorney, Agent, or Firm*—Trask, Britt & Rossa

[57] ABSTRACT

A support system for use in adjusting the incline of exercising equipment such as treadmills is disclosed. The system includes a pair of linked support legs pivotally mounted to one end of the equipment's frame. A length-adjustable gas spring is pivotedly associated with the linked support legs and the treadmill. Control means are provided to adjust the orientation of the spring, thereby controlling the elevation of the exercising equipment and hence its incline.

2 Claims, 4 Drawing Sheets

ADJUSTABLE INCLINE SYSTEM FOR EXERCISE EQUIPMENT

This is a continuation of application Ser. No. 07/494,590, filed Mar. 16, 1990, now abandoned, which was a continuation of Ser. No. 07/256,486, filed Oct. 12, 1988, now U.S. Pat. No. 4,913,396.

BACKGROUND OF THE INVENTION

1. Field

The invention relates to incline support systems. More specifically, the invention is directed to support systems adapted for use with exercise equipment such as treadmills.

2. Statement of the Art

The functionality of many types of exercising equipment is enhanced by modifying the orientation of that equipment relative to an underlying support surface. In many instances, this capability to reorient the equipment permits the user to adjust and oftentimes increase the level of difficulty of exercises performed using the equipment. This capability becomes important when one recognizes that training, utilizing such equipment, is directed toward increasing the user's physical abilities. As those abilities are augmented, it is desirable that the user may periodically adjust the level of difficulty of the equipment so as to provide a device conducive to challenging the user's physical abilities and thereby contributing to an enhancement of these abilities.

The difficulties in rendering exercise equipment incline adjustable results in part from the weight of such equipment. Due to the stress which such equipment must endure in use, oftentimes such equipment is fabricated from various types of metals, which cause the equipment to be generally heavy. Adjusting the incline of the equipment may be difficult if the user must lift the equipment to the desired height and then manipulate a retaining device which is operable to retain the equipment at the desired height. As a result, some exercise equipment requires two or more individuals to adjust the incline thereof, i.e. one individual holding the equipment in place while the second actuates the retaining device.

A conventional incline system is illustrated in U.S. Pat. No. 4,477,071 (Davis). FIG. 6i of that disclosure illustrates an adjustable incline system which consists of an inverted "T"-shaped support leg having a plurality of open-ended channels defined in the shaft region thereof. The support leg is received within a socket. The socket sidewall defines a pair of oppositely positioned holes which are positioned to register one with another. A pin is inserted through the socket hole and thereafter through one of the support leg channels. The pin subsequently is received in the opposing socket sidewall hole whereby the support leg is detachably retained in the apparatus mounted socket. The incline of the apparatus may be altered by slidingly removing the pin and adjusting the support leg to align another channel in registration with the socket holes. Thereafter, the pin is reinserted to retain the support leg in the desired orientation. Recognizably, the apparatus must be lifted in order to facilitate any adjustment to its incline.

A second embodiment of an incline system is depicted in U.S. Pat. No. 4,374,587 (Ogden) wherein a pair of upright threaded support legs are mounted spacedly apart from one another on the end of a treadmill. The bottom end of each support is rotatably mounted by a ball joint to a footing which rests on the underlying support surface, e.g. the ground. A female threaded socket is mounted on each support, each socket being fixedly mounted to the apparatus to be inclined. One of the supports includes a hand crank mounted thereon. The crankable support is mechanically connected to the non-cranked support by a chain which is trained about sprockets mounted on each of the two supports. A cranked rotation of the first support effects a corresponding rotation of the second support. The sockets are displaced upwards or downwards depending on the direction of rotation of the supports. The apparatus, being mounted to the sockets, is displaced by the sockets.

The Ogden construction involves a considerable amount of structure to effect the lifting or incline function.

A continued need exists for an inclined system which is at once simple in construction yet operative to yield a desired equipment incline with a minimum of energy.

SUMMARY OF THE INVENTION

The incline system of the invention includes an adjustable support means which is mountable to an apparatus to be supported. The support means is at once simple in construction and operable by one individual with a minimum of effort. The support means may be pivotally mounted on its first end to the apparatus, whereby an angular rotation of the support means about its pivot axis causes the incline of the apparatus to be varied. The support means may be mounted to the underside of the apparatus, such that an angular rotation of the support means causes a second end of that means to be urged outward away from the equipment. It is the action of this second end against the underlying support surface which causes the equipment to be either urged away from the underlying surface, e.g. upward, or toward that surface, e.g. downward, to a desired incline elevation.

The support means is mechanically associated with a length adjustable pneumatic (gas) spring which is mounted on its first end to the support means. The pneumatic spring includes an actuation means, e.g. a depressible pin, adapted to alter the pressure or force applied to a piston rod by its piston, which piston is sealingly retained in the cylinder of the spring. The piston rod is mounted at its opposing end, preferably pivotally, to the apparatus being supported.

A control means is mounted to the pneumatic spring itself and may extend to a mounting on the apparatus itself. This control means is adapted to engage the actuation means on the pneumatic spring and depress that actuation means.

In a preferred embodiment, the control means includes a manually operable lever which is mounted remote from the pneumatic spring, and preferably proximate the anticipated location of a user utilizing the exercise equipment, i.e. the control means lever is mounted on the apparatus within reach of the apparatus user. A cable, having one end mounted to the control lever, extends to a lever-fitted platform fixedly mounted to either the pneumatic spring or on the apparatus itself proximate the actuation means. The cable is connected to the lever on that platform such that a displacement of that cable in a first direction causes that lever to be brought into a forced abutment against the actuation means sufficient to depress i.e., actuate that actuation means.

Operationally, the user can adjust the elevation or incline of the apparatus by manipulating the control lever while standing on the treadmill. The resulting cable displacement functions to bring the lever into contact with the actuation means with sufficient force to depress the actuation means and cause the piston valve to be opened and thereby facilitating the piston's movement within the cylinder of the spring unit. The user can control the degree of elevation achieved by varying his location on the treadmill itself. To maximize the inclination, the user stands proximate that end of the treadmill which is opposite from the end having the support system attached hereto. When the user stands on the treadmill closer to the end having the support system attached thereto, the degree of elevation occasioned by actuating the cylinder is less. The piston rod, in turn causes the support means to rotate about its pivot axis, whereby the end of the support means may be urged outwardly away from the supported apparatus, causing that apparatus to be elevated, i.e. inclined.

DETAILED DESCRIPTION OF THE DRAWINGS

Figure 1:
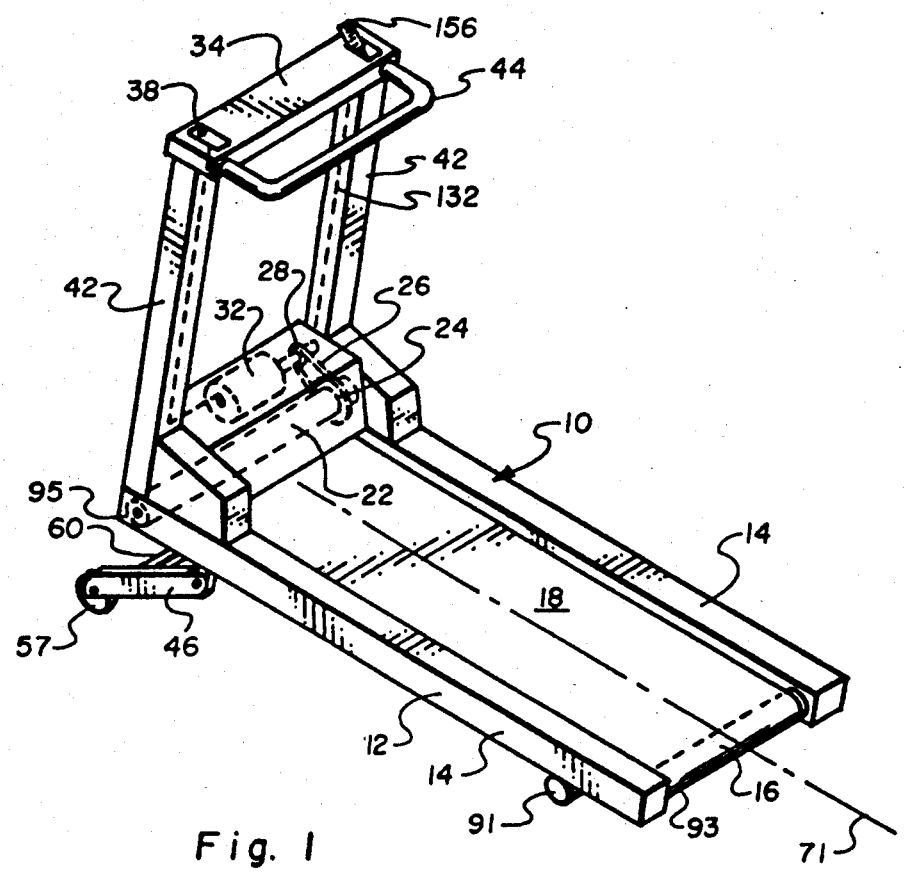
FIG. 1 is an elevated perspective view of a treadmill having an adjustable incline support mounted thereto.

As illustrated in FIG. 1, a treadmill generally 10 is constituted by an elongate lower frame 12 having two rail-like members 14 positioned parallel and spacedly apart from one another. An elongate, cylindrical roller 16 is rotationally mounted to each of the frame rail members 14 to extend between those members to provide a path-defining structure for an endless belt 18 which is trained thereover. Positioned on the opposing end of the rail members 14 is a second elongate cylindrical roller 22 which is similarly rotationally mounted to extend between the spacedly positioned frame rail members 14. A pulley 24 mounted on the second roller 22 has a belt 26 trained thereover, which belt 26 is also trained over a pulley 28 mounted to an electric motor 32. When the motor 32 is actuated, it rotates the pulley 28. In turn, pulley 28 rotates pulley 24 through means of belt 26. The roller 22 is in turn rotated, causing belt 18 to be driven over the rollers 16 and 22 in an endless continuous path. The operation of the motor 32 is controlled by electrical control means 38 mounted on the console 34. The control means 38 is electrically connected to the motor 32.

Console 34 is supported by two upright supports 42 which are mounted on frame rail members 14. Mounted on console 34 is a "U"-shaped bar 44 configured to be held by a user standing on the belt 18.

Figure 2:
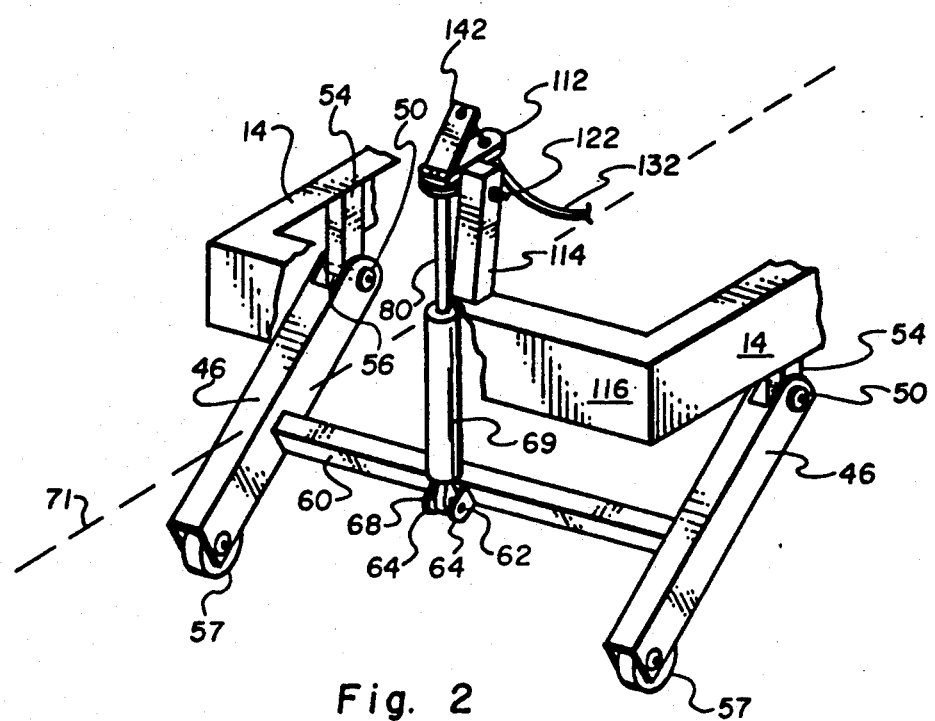
FIG. 2 is an elevated sectional perspective view of a pneumatic spring actuated support.
Figure 3:
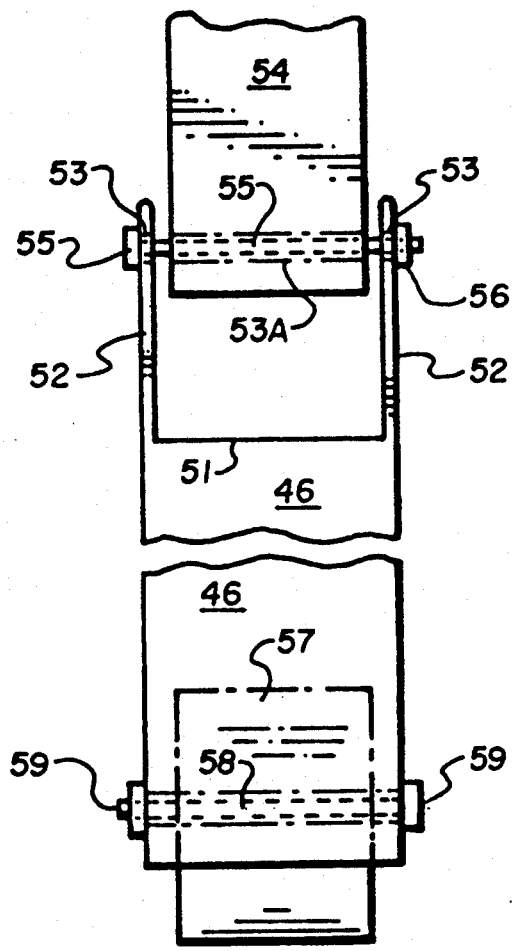
FIG. 3 is a front view of a support leg illustrating the pivot connection means thereof.

FIGS. 2 and 3 illustrate in an elevated sectional perspective view some of the principal components of the adjustable incline system. A pair of elongate, shaft-like support legs 46 are each pivotally mounted to a respective frame rail member 14 by means of a nut and bolt arrangement 50. As shown, each support leg 46 includes on a first end thereof a bifurcated fork-like clevis 51. Each fork 52 of the clevis 51 defines an aperture 53 therein in register with an aperture defined within an opposing fork of the clevis 51. A shaft-like extension 54, mounted on each frame rail 14, defines a channel 53A therethrough. The channel 53A in the extension 54 is aligned with the apertures 53 in the bifurcated forks 52 of the clevis 51 and a bolt 55, having male threads on its end, is extended through the apertures 53 and channel 53A to form a pivot mounting for each support leg 46. A female threaded nut 56 is threadedly mounted on the bolt 55 to retain the bolt 55 in place.

A wheel 57 is rotatably mounted in the opposing end of each support leg by means of an elongate axle 58 formed by a nut and bolt arrangement 59 which passes through apertures defined in the support 46 similar to the above-described mounting of the support on extension 54. The support leg 46 as illustrated has a generally "U"-shaped cross-section when viewed from its end. Each wheel 57 is positioned to rollingly contact and abut against an underlying surface, e.g. the ground or floor on which the treadmill 10 is placed.

A connection or cross bar 60 is mounted to each support leg 46 at a location intermediate the opposing ends of each support leg 46. In a preferred embodiment, the cross bar is mounted midway between the opposing ends of each support leg 46.

Support legs 46 and cross bar 60 may be fabricated from steel or some other rigid structural material.

Positioned along the length of cross bar 60 and preferably midway between the opposing ends of the cross bar 60 is a mounting bracket 62. As illustrated, bracket 62 is mounted to cross bar 60 to extend outwardly therefrom. The bracket 62 includes two extensions which each define an aperture therein, one aperture being in register with the other. A bolt 64 extends through the apertures. The bolt 64 also passes through an eye 66 defined in the end extension 68 of a gas spring 69. The head of the bolt 64, in cooperation with a female threaded nut 70 threaded onto the male threads on the end of the bolt 64 retain the gas spring 69 in a pivoting association with bracket 62. The gas spring 69 is mounted centrally, preferably midway between the two support legs 46, and generally midway between the opposing rails 14 of the treadmill frame 12. As shown in FIG. 2, the gas spring 69 may be positioned vertically and upright such that it intersects the longitudinal axis 71 of the treadmill 10.

In a previous patent disclosure (see U.S. Pat. No. 4,591,147 (Smith et al.) wherein gas springs had been utilized in a treadmill support system, a gas spring had been associated with and positioned proximate to each of two outwardly extending support legs, i.e., the gas springs are not positioned centrally of the treadmill frame but were positioned laterally of the treadmill's longitudinal axis. In the instant embodiment the gas spring 69 is positioned on the longitudinal axis 71 of the treadmill, i.e. centrally within the treadmill frame.

Adjustable gas springs 69 which may be utilized in the invention are those manufactured by the Gas Spring Company of Colmar, Pennsylvania and Suspa of Altdorf, West Germany. More specific description of gas springs which may be used in this application are disclosed in U.S. Pat. Nos. 3,966,182; 3,963,101, 4,093,196 and U.K. Patent 1,505,702, the disclosures of which are hereby incorporated by reference.

Figure 7:
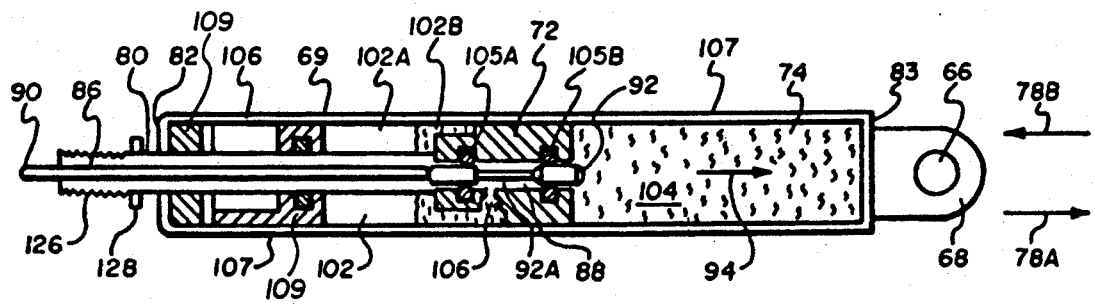
FIG. 7 is a cross-sectional side view of a length adjustable gas spring of the invention.

A preferred gas spring 69 utilized in the invention is of a type wherein the positioning of a piston 72 within a hollow cylinder 74 is made adjustable by a valving system 76. As shown in FIG. 7, a hollow closed ended cylinder 74 contains a cylindrically shaped piston 72, the piston 72 being reciprocably mounted within the cylinder 74 for movement in the directions indicated by arrows 78A and 78B. The piston 72 is mounted with a piston rod 80, which extends outwardly and sealedly through one of the closed endwalls of the cylinder 74, and is likewise made reciprocably slidable through that endwall 82. The endwall 82 of the cylinder 74 includes a seal which abuts against the rod 80 to form an air-tight seal thereagainst. On the opposing endwall 83 of cylinder 74 the extension 68 which defines an eyelet 66 therein is fixedly mounted.

Figure 8:
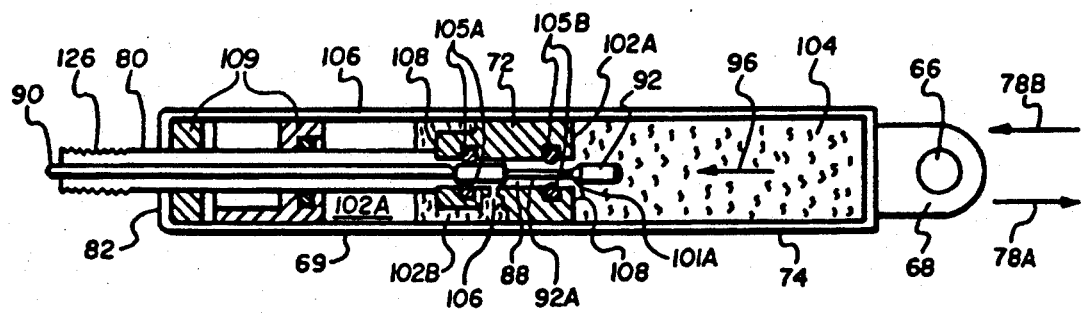
FIG. 8 is a cross-sectional side view of the length adjustable gas spring shown in FIG. 7, oriented in an actuated condition.

The piston rod is shown as defining a hollow elongate channel 86 which extends along the length of the rod 80. Piston 72 defines an elongate channel 88 which communicates one end of the piston with its opposing end. An elongate cylindrical rod 90 is inserted into channel 86 and is reciprocably slidable within that channel. Rod 90 mechanically engages a valve 92 mounted within the piston 72 whereby a displacement of the rod 90 in the direction indicated by arrow 94 operates to open the valve 92 as shown in FIG. 8. A displacement of the rod 90 in the direction indicated by arrow 96 sufficient to remove the rod 90 from an urging engagement against the valve 92 causes the valve 92 to return to a closed orientation shown in FIG. 7. An orifice 106 defined within the piston 72 communicates with a first sealed pressure chamber 102. As illustrated, chamber 102 contains a pressurized gas 102A and a liquid, e.g. oil 102B. A second sealed pressure chamber 104 positioned on the opposite side of the piston 72 is filled with a liquid, e.g. oil 104A. Each of these pressure chambers are formed by an association of a respective endwall of the cylinder 74, a portion of the sidewall 107 of cylinder 74 and an endwall 108 of piston 72. As shown in FIGS. 7 and 8, a plurality of seals 109 form an endwall of the chamber 102. The seals 109 form a fluid-tight seal against rod 80 and the sidewalls 107.

In the closed orientation illustrated in FIG. 7, the cylinder acts as a dampening means in that forces directed along the rod 80 in the direction indicated by arrow 78A are resisted by the fluid in chamber 104. Forces directed in the direction indicated by arrow 78B are resisted by the fluids in chamber 102. As the valve 92 is actuated by a displacement of the rod 90, the valve 92 is displaced partially through the piston channel 88 such that the valve seat 101A clears the open port of channel 88. As shown in FIG. 7, seals 105A and 105B mounted within piston 72 abut against the valve 92 to seal that portion of channel 88 positioned between the two seals. Therefore, the oil in chamber 102 is precluded from flowing into chamber 104, through piston orifice 106 and around the valve 92. As the valve 92 is displaced as shown in FIG. 8, the seals 105B no longer form a seal against the valve 92 due to its medianly positioned neck 92A. As a result, the oil in chamber 102 is displaced through the orifice 106 due to the pressure exerted thereon by the high pressure gaseous fluid in chamber 102. The oil flows into channel 88 around the valve 92 and then through the open port of channel 88 and thereafter into chamber 104. Due to the incompressibility of the oil and the narrow passageway, the flow of oil is relatively slow, permitting a substantially controlled displacement of the piston 72. As the oil flows, the piston 72 is displaced in the direction indicated by arrow 78B, causing the rod 80 to be extended outward from the cylinder and thereby elevating or increasing the incline of the treadmill. To lower the treadmill, the user stands on the treadmill substantially over and atop the gas cylinder support and opens the valve 92. The weight of the user overcomes the pressure exerted on the oil 102B by the gas 102A in that the pressure applied to the oil in chamber 104 by piston 72 causes that oil to flow into chamber 102 through a reversal of the route previously described, i.e. through the open port of channel 88, around valve 92 and through orifice 106 and thereafter into chamber 102.

In operation, a force loading of the piston rod 80 in the direction indicated by arrow 94 causes a force loading on the piston 72 within the cylinder 74.

When the user wishes to adjust the elevation of the treadmill, i.e. the incline imparted to the treadmill by the gas spring 69, the rod 90 is depressed (i.e. displaced in the direction indicated by arrow 96). The rod 90 thereby actuates valve 92 and opens channel 88. If the user desires to lower the inclined end 95 of the treadmill, he then applies a force to that end 95, for example by standing on that end and thereby applying his body weight to the piston rod 80 and piston 72. Since the two pressure chambers 102 and 104 are now pneumatically (i.e. hydraulically in the case of liquids being in the cylinder) connected, air or liquid within pressure chamber 104 flows through channel 88 into chamber 102, until an equilibrium of forces is achieved. After the forces, i.e. the pressure induced force in chamber 102 on the piston 72, supplemented by the force applied to piston 72 by the user's weight opposing the pressure induced force in chamber 104 on piston 72 are balanced, the rod 90 is displaced in the direction indicated by arrow 96, until the valve 92 is no longer engaged, e.g. urged outward by the rod 90 and thereby returns to its closed orientation. Thereafter, while the user is on the treadmill, the elevation of the inclined end is retained at substantially the new height. Understandably, the height of the elevated treadmill end may vary somewhat as the location of the user on the treadmill is varied e.g. as the user approaches the opposing end of the treadmill the magnitude of force being applied to the piston rod 90 is decreased, thereby causing a slight increase in elevation, since the force applied to the piston 72 by the fluid in chamber 104 is now greater than the total opposing force made up of that resulting from the gas in chamber 102 in conjunction with the force being applied externally to the piston 72 by rod 80.

The ability to change the treadmill's elevation while the user is standing on the treadmill is novel in that prior devices have conventionally required the user to step off the treadmill in order to modify the treadmill's orientation.

As shown in FIG. 1, the treadmill contacts the underlying surface, e.g. the ground, through intermediation of an elongate support 91. In actuating the incline system, the user can adjust the amount of force being applied to the gas cylinder by varying his location vis-a-vis the support 91. Noticeably, when a force is directed against the action of the gas spring, the degree of incline afforded by the spring's action will be reduced accordingly. By locating himself on the treadmill between the support 91 and the end 93 of the treadmill, the user's weight actually urges the opposing end 95 of the treadmill upwards, thereby assisting the gas cylinder in increasing the inclination. The support 91 acts much like a fulcrum in a conventional leverage sense. As the user varies his location by advancing beyond the support 91 and thereby approaching the end 95, the amount of the user's weight which is directed in opposition to the gas spring's length expansion is increased. Therefore, the inclination achieved by actuating the gas spring is reduced as the location of the user advances toward end 95 during the period of the gas spring's actuation.

After the desired positioning of the piston within the cylinder is achieved, the valve 92 is closed; whereupon, the pneumatic and/or hydraulic pressures being substantially balanced, those pressures operate to retain the treadmill in the selected orientation.

FIG. 8 illustrates the gas spring 69 in an actuated condition. As shown, the valve 92 has been inserted partially through the piston head channel 88 sufficiently that the valve seat 101A on the end of that valve is positioned clear of the open port 102A of the channel 88. Liquid 102A can then be directed through orifice 106.

As shown in FIG. 2, in a preferred embodiment, the gas cylinder of the type shown in FIG. 7 is positioned such that its extension 68 is pivotedly mounted on bracket 62. The cylinder extends upwardly, oftentimes at an angle inclined to the horizon. The rod 80 extends outwardly from the cylinder 74 to be received within a mounting platform 112 which in turn is pivotedly mounted to a rigid support 114 mounted on a cross bar 116 of the frame 12 of the treadmill 10.

Figure 4:
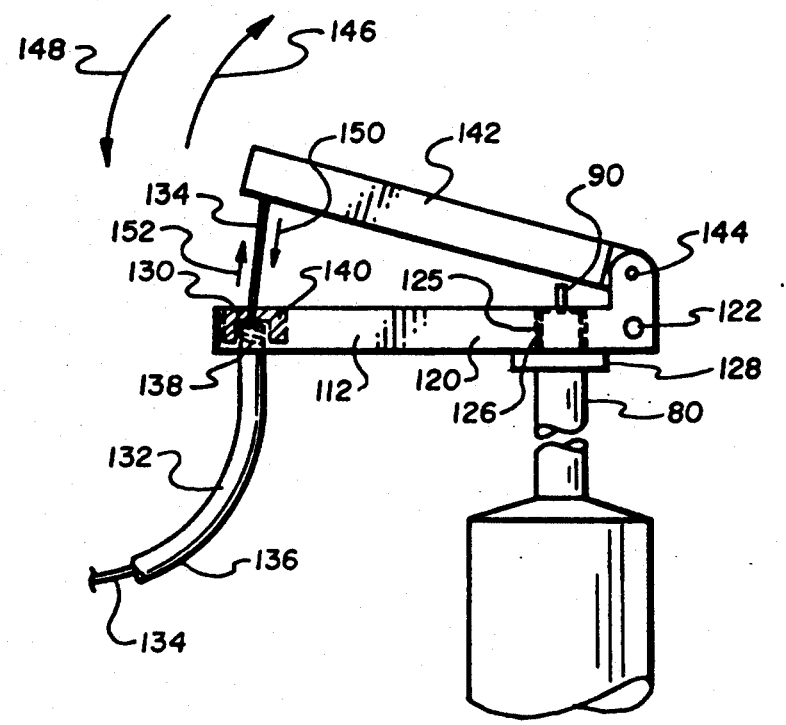
FIG. 4 is a side view of a pneumatic spring in association with a cable actuated lever and support platform.
Figure 5:
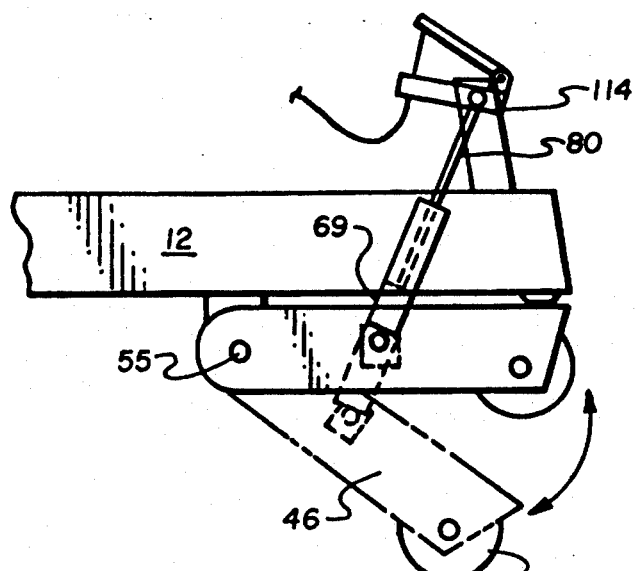
FIG. 5 is a sectional side view of a support leg of the invention shown in a retracted and extended position.

As shown to advantage in FIGS. 2 and 4, platform 112 includes a first elongate base 120 which may be pivotedly or fixedly secured to support 114 by a nut and bolt fitting 122. The base 120 defines a female threaded aperture 125 which threadedly receives the male threaded extension 126 mounted on gas spring 69. A threaded nut 128 may be threaded onto the extension 126 and may be threaded into abutment against the platform to secure the extension 126 within the aperture 125. The platform base 120 also defines a second aperture 130 therein which slidingly receives a cable 132 having a resilient metal core 134. Core 134 is slidingly and reciprocably mounted within a plastic cover 136. Fitted on the end of cable 132 is a male threaded extension 138 which is secured to the cover 136. The core 134 passes slidingly and reciprocably through the extension 138. Cable 132 extends through aperture 130, extension 138 being positioned within the aperture 130. A female threaded nut 140 threadingly cooperates with the extension 138 to retain the extension 138 in position within the aperture 130 on the base 120 as shown to advantage in FIG. 4.

The core 134 extends outwardly from aperture 130 and is fixedly secured to one end of an elongate lever 142. As shown, lever 142 is pivotedly mounted at its other end to base 120 by a pivot pin 144 which passes through registered openings in the base 120 and the lever 142. Lever 142 is pivotable in the directions shown by arrows 146 and 148. As the cable core 134 is retracted into cable cover 136 in the direction shown by arrow 150, the lever 142 is brought into abutment against rod 90, thereby actuating, i.e. opening valve 92 as previously described above. An extension of the core 134 outward from the cover 136 as shown by arrow 152 causes the lever to be urged outward away from the rod 90, thereby causing the valve to be urged into a closed orientation.

Figure 6:
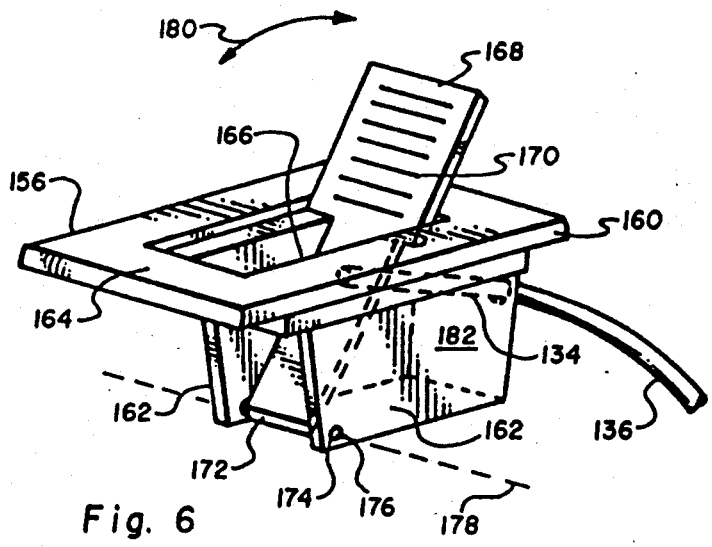
FIG. 6 is a perspective view of a control lever of the invention.

Cable 132 extends from platform 120 upward along supports 42 and is mounted to console 34 by means of a control lever 156 as illustrated in FIGS. 1 and 6. Lever 156 includes a frame 160 defining a pair of spaced vertical extensions 162 and a perpendicularly oriented base platform 164 mounted on those extensions 162. The platform 164 and extensions 162 define a channel 166 in which is mounted a lever 168. As shown, lever 168 is an elongate member having a graspable end 170. The opposing end 172 is pivotedly mounted between and to the extensions 162 by means of pivot pins 174 which extend outwardly from opposing sides of the lever 168 and are slidably received in openings 176 defined within the extensions 162.

The core 134 of cable 132 is secured to the lever 168 as shown. The cover 136 of cable 132 is secured to an endwall 182 which is mounted between the extensions 162, such that the core 134 may be freely slided in and out of the cover 136 while that cover is retained in place. The cover 136 may be mounted to the endwall utilizing a mounting arrangement similar to that shown in FIG. 4 and utilized to secure the cover 136 to the base 120. The lever being reciprocably rotatable about its pivot axis 178 in the directions indicated by arrow 180, permits the user to grasp its end 170 and thereby pivot the lever to either retract or extend the core 134 from cover 136. The effects of the displacement of the core 134 vis-a-vis the gas spring 69 have previously been explained.

The instant embodiment provides a means for the user to adjust the inclined height of one end of the treadmill by manipulating the lever and adjusting the forces being applied to the treadmill by the gas spring. Thereafter, the lever is reset so as to close the valve 92 and lock the gas spring into the desired orientation.

It is to be understood that the embodiments of the invention described are merely illustrative of the application of the principles of the invention. Reference herein to details of the illustrated embodiment is not intended to limit the scope of the claims which themselves recite those features regarded as essential to the invention.

What is claimed is:

1. A method of adjusting the incline of a treadmill, said method comprising:

providing a treadmill having a first end, a second end, a frame and a walking surface, said treadmill having a support pivotedly connected to said frame proximate said first end of said treadmill, said support having a proximal end adapted for engaging an underlying surface and supporting said treadmill frame above said underlying surface, said treadmill further including an adjustable pneumatic spring pivotedly mounted to said support on one end of said adjustable pneumatic spring and to said frame on an opposing end of said adjustable pneumatic spring, said adjustable pneumatic spring including a control means adapted for controlling a force exerted by said adjustable penumatic spring on said support and said frame by opening and closing a valve contained within said adjustable penumatic spring, said control means being operable by a user standing upright on said walking surface, said treadmill further including an underlying surface engaging fulcrum mounted on said frame proximate said second end of said treadmill;

positioning a user in an upright orientation atop said walking surface;

said user actuating said control means to open said valve, said adjustable pneumatic spring thereby operating to urge said proximal end of said support outward away from said frame and along said underlying support surface, said proximal end of said support thereby applying an upwardly directed force to said treadmill frame and urging said treadmill frame upwardly;

said user walking along said walking surface between said underlying surface engaging fulcrum and said first end of said treadmill to apply a downwardly directed force on said treadmill in opposition to said force being applied by said adjustable pneumatic spring;

said user positioning himself at a location on said walking surface between said fulcrum and said first end of said treadmill to a selected, downwardly directed force on said treadmill sufficient to counteract said upwardly directed force and to position said treadmill walking surface in a selected inclination; and said user operating said control means from an upright orientation atop said walking surface to close said valve and thereby lock said adjustable pneumatic spring in place to lock said treadmill walking surface in said selected inclination.

2. A method of increasing the incline of a treadmill, said method comprising:

providing a treadmill having a first end, a second end, a frame and a walking surface, said treadmill having a support pivotedly connected to said frame proximate said first end of said treadmill, said support having a proximal end adapted for engaging an underlying surface and supporting said treadmill frame above said underlying surface, said treadmill further including an adjustable pneumatic spring pivotedly mounted to said support on one end of said adjustable pneumatic spring and to said frame on an opposing end of said adjustable pneumatic spring, said adjustable pneumatic spring including a control means adapted for controlling a force exerted by said adjustable pneumatic spring on said support and said frame by opening and closing a valve contained within said adjustable pneumatic spring, said control means being operable by a user standing upright on said walking surface, said treadmill further including an underlying surface engaging fulcrum mounted on said frame proximate said second end of said treadmill;

positioning a user in an upright orientation atop said walking surface;

said user actuating said control means to open said valve, said adjustable pneumatic spring thereby operating to urge said proximal end of said support outward away from said frame and along said underlying support surface, said proximal end of said support thereby applying an upwardly directed force to said treadmill frame and urging said treadmill frame upwardly;

said user walking along said walking surface between said underlying surface engaging fulcrum and said second end of said treadmill to apply a downwardly directed force on said treadmill in assistance to said force being applied by said adjustable pneumatic spring;

said user positioning himself at a location on said walking surface between said fulcrum and said second end of said treadmill to a selected, downwardly directed force on said treadmill sufficient to counteract said upwardly directed force and to position said treadmill walking surface in a selected inclination; and said user operating said control means from an upright orientation atop said walking surface to close said valve and thereby lock said adjustable pneumatic spring in place to lock said treadmill walking surface in said selected inclination.

* * * * *

UNITED STATES PATENT AND TRADEMARK OFFICE
CERTIFICATE OF CORRECTION

PATENT NO. : 5,192,255

DATED : March 9, 1993

INVENTOR(S) : Dalebout et al.

It is certified that error appears in the above-identified patent and that said Letters Patent is hereby corrected as shown below:

In Column 9, line 19, insert the word "apply" between "to" and "a";

In Column 10, line 30, insert the word "apply" between "to" and "a".

Signed and Sealed this

Eighth Day of November, 1994

Attest:

BRUCE LEHMAN

Attesting Officer     Commissioner of Patents and Trademarks

REEXAMINATION CERTIFICATE (2464th)
United States Patent [19]
Dalebout et al.

[11] B1 5,192,255
[45] Certificate Issued  Jan. 31, 1995

[54] ADJUSTABLE INCLINE SYSTEM FOR EXERCISE EQUIPMENT

[75] Inventors: William T. Dalebout; S. Ty Measom; Scott R. Watterson, all of Logan, Utah

[73] Assignee: Citicorp North America, Inc.

Reexamination Request:
No. 90/003,477, Jun. 27, 1994

Reexamination Certificate for:
| | |
|---|---|
| Patent No.: | 5,192,255 |
| Issued: | Mar. 9, 1993 |
| Appl. No.: | 806,977 |
| Filed: | Dec. 12, 1991 |

Certificate of Correction issued Nov. 8, 1994.

Related U.S. Application Data

[63] Continuation of Ser. No. 494,590, Mar. 16, 1990, abandoned, which is a continuation of Ser. No. 256,486, Oct. 12, 1988, Pat. No. 4,913,396.

[51] Int. Cl.⁶ ............................................. A63B 23/00
[52] U.S. Cl. ....................................... 482/54; 248/371
[58] Field of Search ............... 248/371, 649, 398, 654; 482/54

[56] References Cited
FOREIGN PATENT DOCUMENTS
2429618 9/1975 Germany.
2078503 1/1982 United Kingdom.

OTHER PUBLICATIONS

Ajay Treadmill Owner's Manual, *Variable Speed Motorized Treadmill* (no date).
Sears Treadmill Owner's Manual, *Executive Lifestyler 4000* (no date).

*Primary Examiner*—Blair M. Johnson

[57] ABSTRACT

A support system for use in adjusting the incline of exercising equipment such as treadmills is disclosed. The system includes a pair of linked support legs pivotally mounted to one end of the equipment's frame. A length-adjustable gas spring is pivotedly associated with the linked support legs and the treadmill. Control means are provided to adjust the orientation of the spring, thereby controlling the elevation of the exercising equipment and hence its incline.

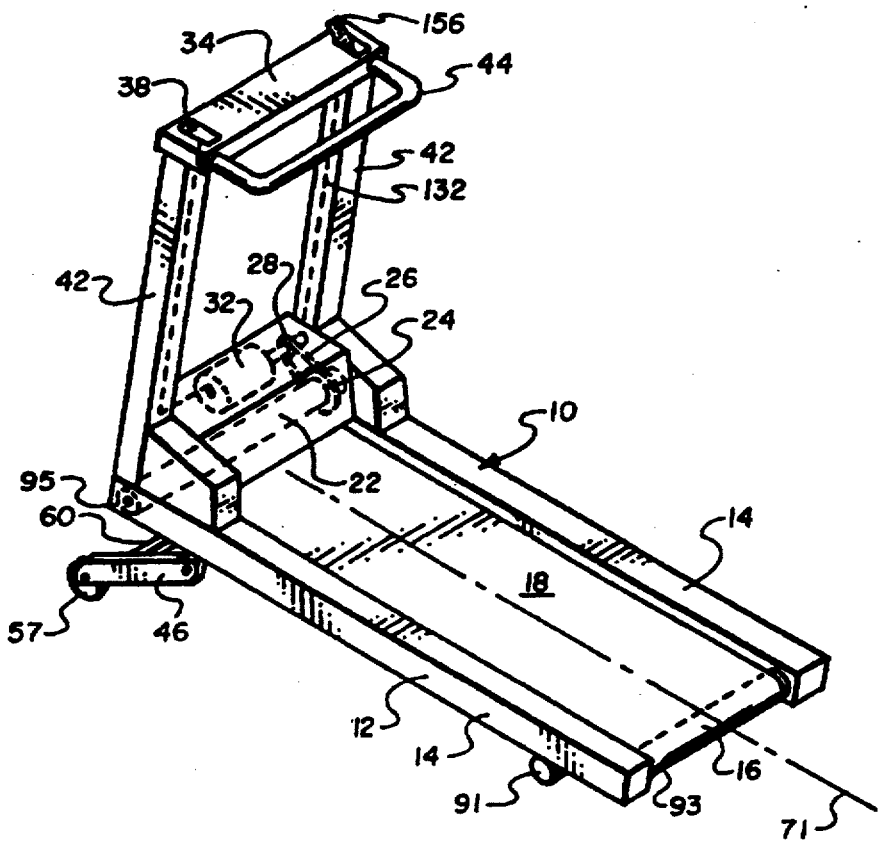

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *